United States Patent

Gress, Jr. et al.

[11] Patent Number: 5,856,643
[45] Date of Patent: Jan. 5, 1999

[54] AUXILIARY CONTACT OPERATOR FOR ELECTRICAL SWITCHING APPARATUS

[75] Inventors: Daniel D. Gress, Jr., Monroeville; Daniel E. Palmieri, Aliquippa; Robert N. Krevokuch, Sewickley Township; William Q. Aglietti, Penn Hills; Ronald E. Vaill, Penn Township, all of Pa.

[73] Assignee: Eaton Corporation, Cleveland, Ohio

[21] Appl. No.: 914,599

[22] Filed: Aug. 18, 1997

[51] Int. Cl.$^6$ ....................................................... H01H 5/06
[52] U.S. Cl. ........................................ 200/50.32; 200/400
[58] Field of Search .............................. 200/50.32, 50.21, 200/50.39, 400

[56] References Cited

U.S. PATENT DOCUMENTS

| | | | |
|---|---|---|---|
| 2,791,729 | 5/1957 | Allen et al. | 200/50.32 X |
| 3,875,360 | 4/1975 | Rys | 200/400 |
| 4,176,262 | 11/1979 | McMillen et al. | 200/50.23 |
| 4,565,908 | 1/1986 | Bould | 200/50.22 |
| 4,743,876 | 5/1988 | Milianowicz et al. | 335/20 |
| 5,341,191 | 8/1994 | Crookston et al. | 335/16 |
| 5,424,701 | 6/1995 | Castonguay et al. | 200/400 X |

*Primary Examiner*—Renee S. Luebke
*Attorney, Agent, or Firm*—Martin J. Moran

[57] ABSTRACT

An auxiliary switch operator for a circuit breaker operates auxiliary contacts between open and closed positions. The auxiliary switch operator includes a hub which is biased to follow a pole shaft of the circuit breaker and follow the pole shaft when it rotates in a first direction to close separable contacts of the circuit breaker. A first spring mechanism biases the hub to follow the pole shaft when the pole shaft rotates in the first direction. When the pole shaft rotates in the first direction, an arm of the hub engages a rotatable shaft to drive an operating lever and operate the auxiliary contacts to the closed position. When the pole shaft rotates in the second direction, another arm of the hub recharges the first spring mechanism. A second spring mechanism biases the rotatable shaft and the operating lever toward a position corresponding to the open position of the auxiliary contacts when the pole shaft rotates in the second direction.

23 Claims, 9 Drawing Sheets

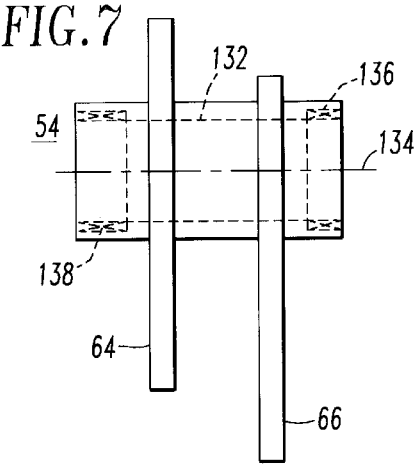
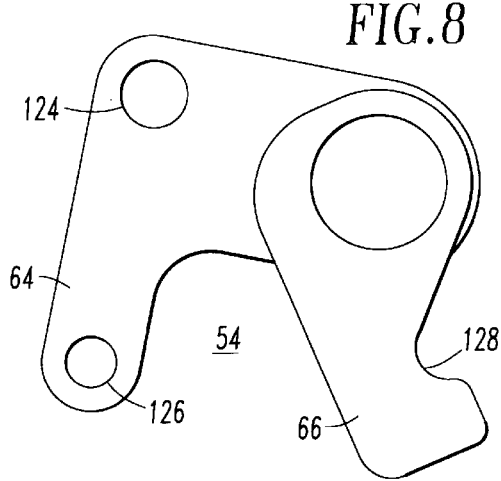
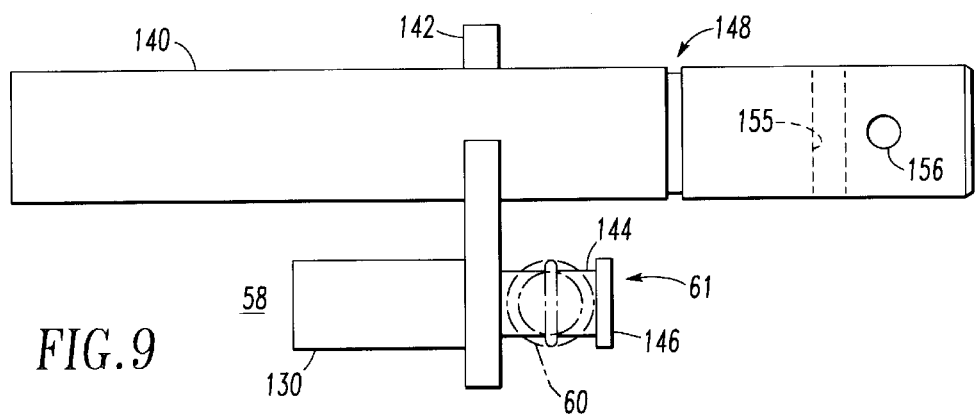
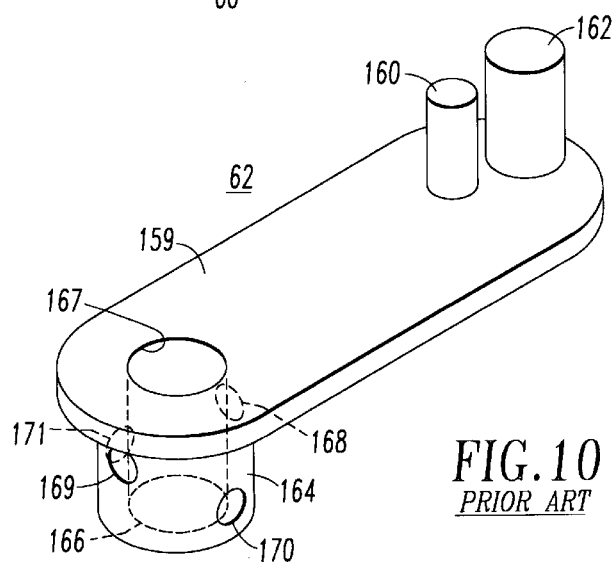
FIG. 10 PRIOR ART

AUXILIARY CONTACT OPERATOR FOR ELECTRICAL SWITCHING APPARATUS

BACKGROUND OF THE INVENTION

1. Field of the Invention

This invention is directed to electrical switching apparatus and, more particularly, to an auxiliary contact operator for an electrical switching apparatus, such as a circuit breaker, and, most particularly, to a mechanism-operated cell (MOC) switch operator for a vacuum circuit breaker.

2. Background of Information

Electrical switching apparatus include, for example, circuit switching devices and circuit interrupters such as circuit breakers, contactors, motor starters, motor controllers and other load controllers. Circuit breakers are generally old and well known in the art. A typical example of a circuit breaker is disclosed in U.S. Pat. No. 5,341,191. Circuit breakers are used to protect electrical circuitry from damage due to an overcurrent condition, such as an overload condition or a relatively high level short circuit condition.

Metal-clad switchgear for removable main circuit breakers is well known in the prior art. A typical example of such switchgear may be found in U.S. Pat. No. 4,743,876. Metal enclosed or metal-clad switchgear apparatus are employed with draw-out circuit breakers which may be levered into position or otherwise disposed in a metal-clad switchgear cabinet for operation. Usually a levering-in or racking-in device with associated and appropriate safety interlocks are taught.

It is also known to utilize auxiliary contacts in association with the main interrupter contacts of metal-clad switchgear apparatus. The auxiliary contacts usually perform indicating or control functions and are not meant to carry the main load current, but are meant to open and close in some direct correspondence with the opening or closing of the main circuit interrupter contacts. In some cases the auxiliary contacts are opened and closed in direct conjunction with the opening and closing of the circuit interrupter contacts and in other cases they are not. In cases where the auxiliary contacts are mounted as part of the metal-clad cabinet rather than on the circuit interrupter itself, it is necessary to provide an inter-linkage between the circuit interrupter and the auxiliary contacts when auxiliary contact operation is desirable.

Drawout circuit breakers are well known in the art. A typical example may be found in U.S. Pat. No. 4,565,908. Such circuit breakers include a drawout mechanism which permits an operator to physically disconnect the circuit breaker from a power source and a load which are electrically interconnected with the circuit breaker by terminals at the rear of the circuit breaker.

A mechanism-operated cell (MOC) switch is typically located in a switchgear cell and is operated by a circuit breaker MOC operator mechanism. A typical example may be found in U.S. Pat. No. 4,176,262. The MOC switch is employed to provide extra or redundant contacts for circuit breaker status and status control.

It is well known that modern technology circuit breaker mechanisms operate with different force, travel, and velocities than older technology breakers. When applying modern technology circuit breaker elements, as retrofit or replacement circuit breakers, for the older technology circuit breakers, worn MOC assemblies may possibly create problems.

Older switchgear MOC assemblies were designed for the circuit breaker technology of the time. Older technology circuit breakers employed relatively massive mechanisms, with relatively high forces and inertias. The resultant travel times and velocities were fairly slow such that, for example, the MOC switch may close in approximately 100 ms, measured from the time the circuit breaker begins to close.

The MOC assembly is typically the only component outside the circuit breaker that affects the dynamics of the circuit breaker. The loading and dynamic characteristics of the MOC assembly are highly variable, as the existing MOC assembly typically may have been in service for some time, with mechanical wear and degradation.

The modern technology vacuum circuit breaker is typically much smaller and lighter than a magnetic air circuit breaker. The vacuum breaker has a much smaller travel specification than the magnetic air breaker and operates much faster. When the state of the art vacuum breaker is used with an existing MOC assembly, the resultant speed of operation of the MOC assembly becomes much faster than with a magnetic air breaker. This results in higher impact loads and mismatched inertias with existing MOC assemblies.

For example, with the state of the art vacuum breaker directly driving the MOC assembly, the vacuum breaker and the MOC assembly complete the closing stroke in about 25 ms versus about 100 ms for the magnetic air breaker. The velocity of the MOC assembly is essentially about four times what it was with the magnetic air breaker. Since kinetic energy is proportional to velocity squared, the kinetic energy of the MOC assembly has increased to about 16 times that of the original design. A similar velocity multiplication also occurs during the opening stroke.

This dramatic increase in kinetic energy may typically create the following results: (1) significant MOC switch overtravel and bounce; (2) the MOC switches malfunction during overtravel and bounce; (3) increased MOC assembly component wear; and (4) increased MOC assembly component breakage. In other words, the new vacuum breaker operates too fast for the existing MOC assembly.

Another aspect of this situation is potentially much more serious. Because the MOC assembly is driven directly by the circuit breaker, the MOC assembly affects the circuit breaker dynamics. In the worst case, a badly worn or broken MOC assembly may stall the circuit breaker.

There remains a need, therefore, for an improved MOC operator mechanism for an electrical switching apparatus which slows down the operation of the MOC assembly.

There is also a need for an improved MOC operator mechanism for an electrical switching apparatus which precludes the stalling of such apparatus by the MOC assembly.

There is a more particular need for such a MOC operator mechanism which increases the reliability of the electrical switching apparatus and the MOC assembly.

There is another more particular need for such a MOC operator mechanism which permits the user to evaluate the condition of the MOC assembly.

SUMMARY OF THE INVENTION

These and other needs are satisfied by the invention which is directed to an operator apparatus for use with an electrical switching apparatus to operate auxiliary contact means. The operator apparatus comprises a following means which is biased to follow a pole shaft of the electrical switching apparatus when the pole shaft rotates in a first direction. A first biasing means biases the following means to follow the pole shaft when the pole shaft rotates in the first direction. Means engaged by the following means operate the auxiliary contact means to a first position when the following means follows the pole shaft and the pole shaft rotates in the first direction. Second biasing means biases the means engaged by the following means toward a position corresponding to the second position of the auxiliary contact means when the pole shaft rotates in the second direction. The following means includes means for recharging the first biasing means when the pole shaft rotates in the second direction.

In this manner, the means engaged by the following means operate the auxiliary contact means to the first position when the following means follows the pole shaft and the pole shaft rotates in the first direction independently of the auxiliary contact means.

As another aspect of the invention, an operator apparatus comprises a drive link having a first end pivotally mounted to a pole shaft means of an electrical switching apparatus and a second end having an elongated opening; hub means for rotation by the second end of the drive link and having arm means fixedly mounted thereto; first biasing means for biasing the hub means in a first rotational direction; shaft means for rotation with respect to the hub means including a rotatable shaft and means for rotating the rotatable shaft, with the arm means of the hub means engaging the means for rotating the rotatable shaft to rotate the shaft means in the first rotational direction; second biasing means for biasing the shaft means in a second rotational direction; and means engaging the rotatable shaft of the shaft means for operating the auxiliary contact means. The arm means of the hub means pivotally engages the second end of the drive link at the elongated opening thereof in order that the pole shaft means rotates from the first position to the second position thereof independently of the auxiliary contact means.

In a preferred embodiment, when the means engaging the rotatable shaft is restrained in a position corresponding to the closed position of the electrical switching apparatus, in order that the rotatable shaft is restrained in a position corresponding to the closed position of the electrical switching apparatus, the hub means freely rotates with respect to the shaft means with the arm means disengaged from the shaft means.

In another preferred embodiment, the pole shaft means first rotates in the other rotational direction to move the drive link. When the means engaging the rotatable shaft of the shaft means is restrained in a position corresponding to the closed position of the electrical switching apparatus, in order that the rotatable shaft is restrained in a position corresponding to the closed position of the electrical switching apparatus, the hub means freely rotates with respect to the shaft means with the arm means disengaged from the shaft means.

As another aspect of the invention, an electrical switching apparatus includes: separable contact means having a first position and a second position; means for moving the separable contact means between the first position and the second position thereof and having a first position corresponding to the first position of the separable contact means and a second position corresponding to the second position of the separable contact means; and operator means for operating auxiliary contact means between first and second positions corresponding to the first and second positions, respectively, of the separable contact means. The operator means comprises: following means biased to follow the means for moving when the means for moving changes to the first position thereof, first biasing means for biasing the following means to follow the means for moving when the means for moving changes to the first position thereof, means engaged by the following means for operating the auxiliary contact means to the first position thereof when the following means follows the means for moving and the means for moving changes to the first position thereof, and second biasing means for biasing the means engaged by the following means toward a position corresponding to the second position of the auxiliary contact means when the means for moving changes to the second position thereof. The following means includes means for recharging the first biasing means when the means for moving changes to the second position thereof.

Preferably, the first biasing means includes adjustable spring means and a gauge having a plurality of positions corresponding to a plurality of adjustments of the adjustable spring means for a plurality of counts of the switches of the auxiliary contact means.

BRIEF DESCRIPTION OF THE DRAWINGS

A full understanding of the invention can be gained from the following description of the preferred embodiments when read in conjunction with the accompanying drawings in which:

FIG. 7 is a front view of a hub of the operator apparatus of FIG. 2;

FIG. 8 is a side view of the hub of FIG. 7;

FIG. 9 is a plan view of a shaft assembly of the operator apparatus of FIG. 2;

FIG. 10 is an isometric view of a drive lever of the operator apparatus of FIG. 2;

DESCRIPTION OF THE PREFERRED EMBODIMENT

Figure 1:
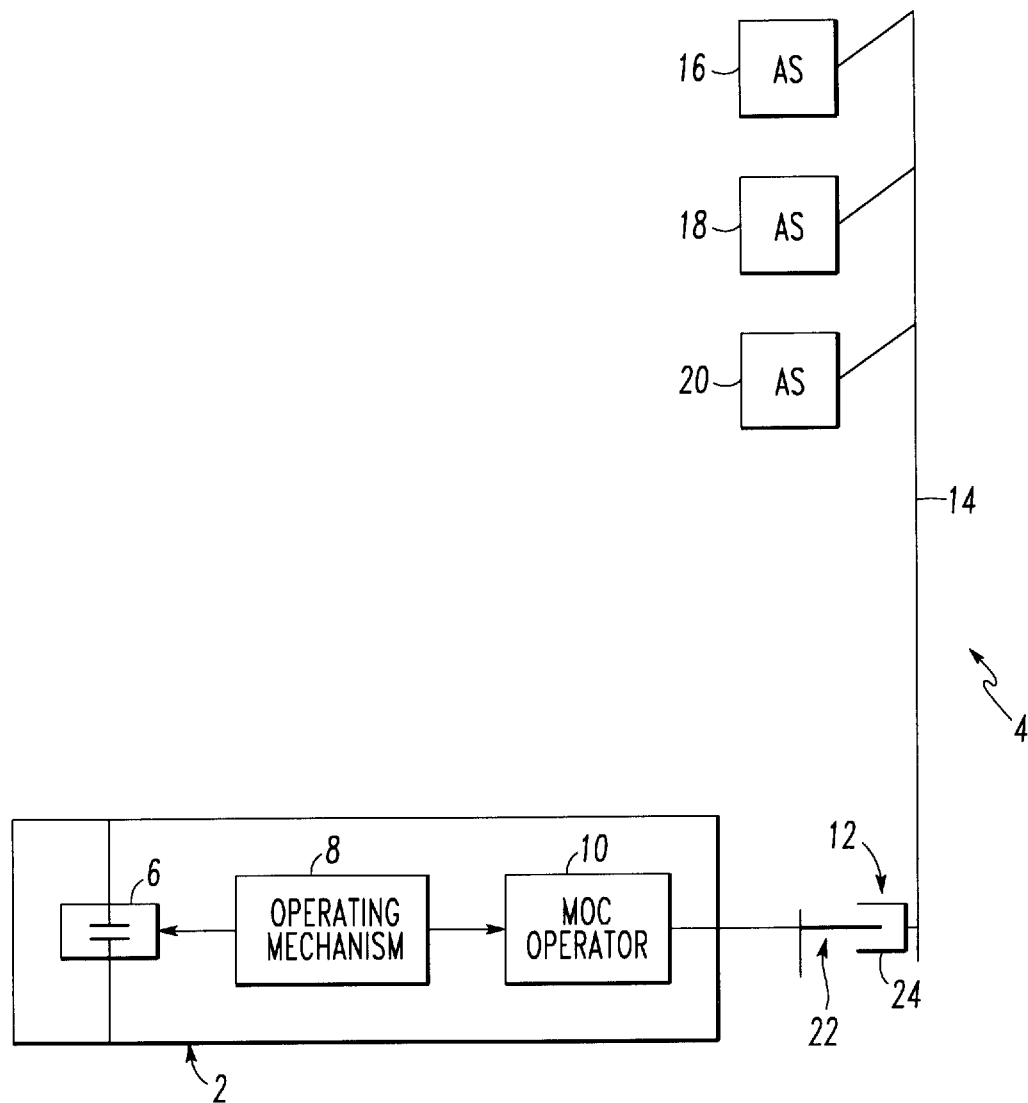
FIG. 1 is a functional block diagram of a vacuum circuit breaker and a mechanism-operated cell (MOC) assembly.

FIG. 1 illustrates a vacuum circuit breaker (VCB) 2 and a mechanism-operated cell (MOC) assembly 4. The VCB 2 includes separable contacts 6 having an open position (as shown in FIG. 1) and a closed position (not shown), an operating mechanism 8 for moving the separable contacts 6 between the open and closed positions, and a MOC operator 10. The MOC assembly 4 includes a pantograph 12, a drive rod 14, and one or more auxiliary switches (AS) 16,18,20. An example of a MOC assembly including pantograph, drive rod and auxiliary switches is disclosed in U.S. Pat. No. 4,176,262, which is incorporated by reference herein.

The pantograph 12 is operated by a drive pin 22 of the MOC operator 10 which moves generally downward to close the switches 16,18,20, in response to the operating mechanism 8 moving the separable contacts 6 to the closed position, and moves generally upward to open such switches, in response to the operating mechanism 8 moving the separable contacts 6 to the open position. Typically, reset springs (not shown) for the switches 16,18,20 bias these switches upward and open whenever VCB 2 is removed from the switchgear cell (not shown). In a similar manner as disclosed in U.S. Pat. No. 4,176,262, the pantograph 12 includes a channel 24 movably supported on support arms (not shown) which are pivotally secured to a side wall (not shown) of the switchgear cell.

An example of a vacuum circuit breaker is a Type 150DHP-VR500 vacuum circuit breaker marketed by Cutler-Hammer. Another example of a metal-clad or metal-enclosed vacuum circuit breaker is disclosed in U.S. Pat. No. 4,743,876, which is incorporated by reference herein.

Figure 2:
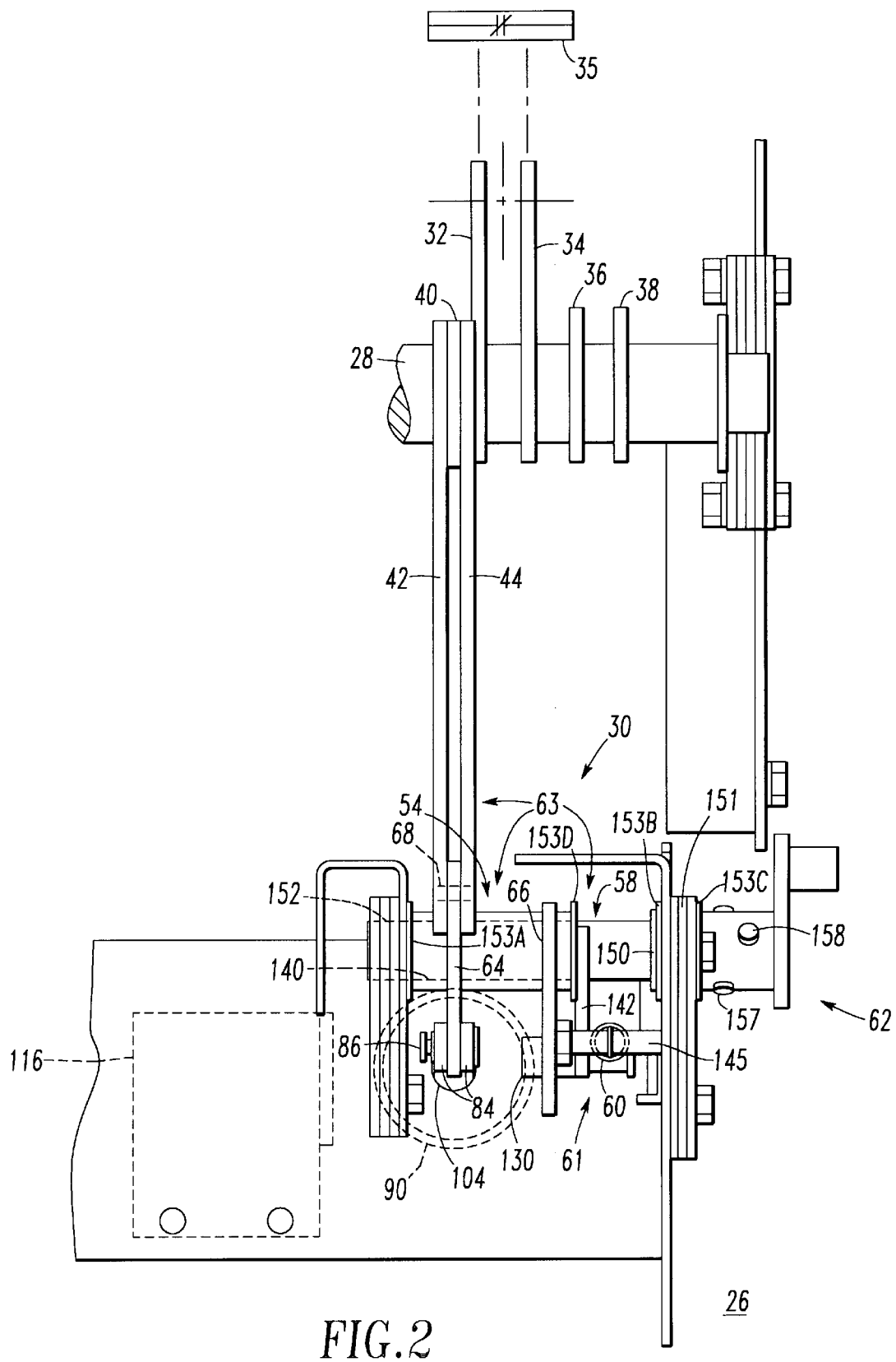
FIG. 2 is a front view of a vacuum circuit breaker operator apparatus in accordance with the invention for operating the MOC assembly of FIG. 1.
Figure 3:
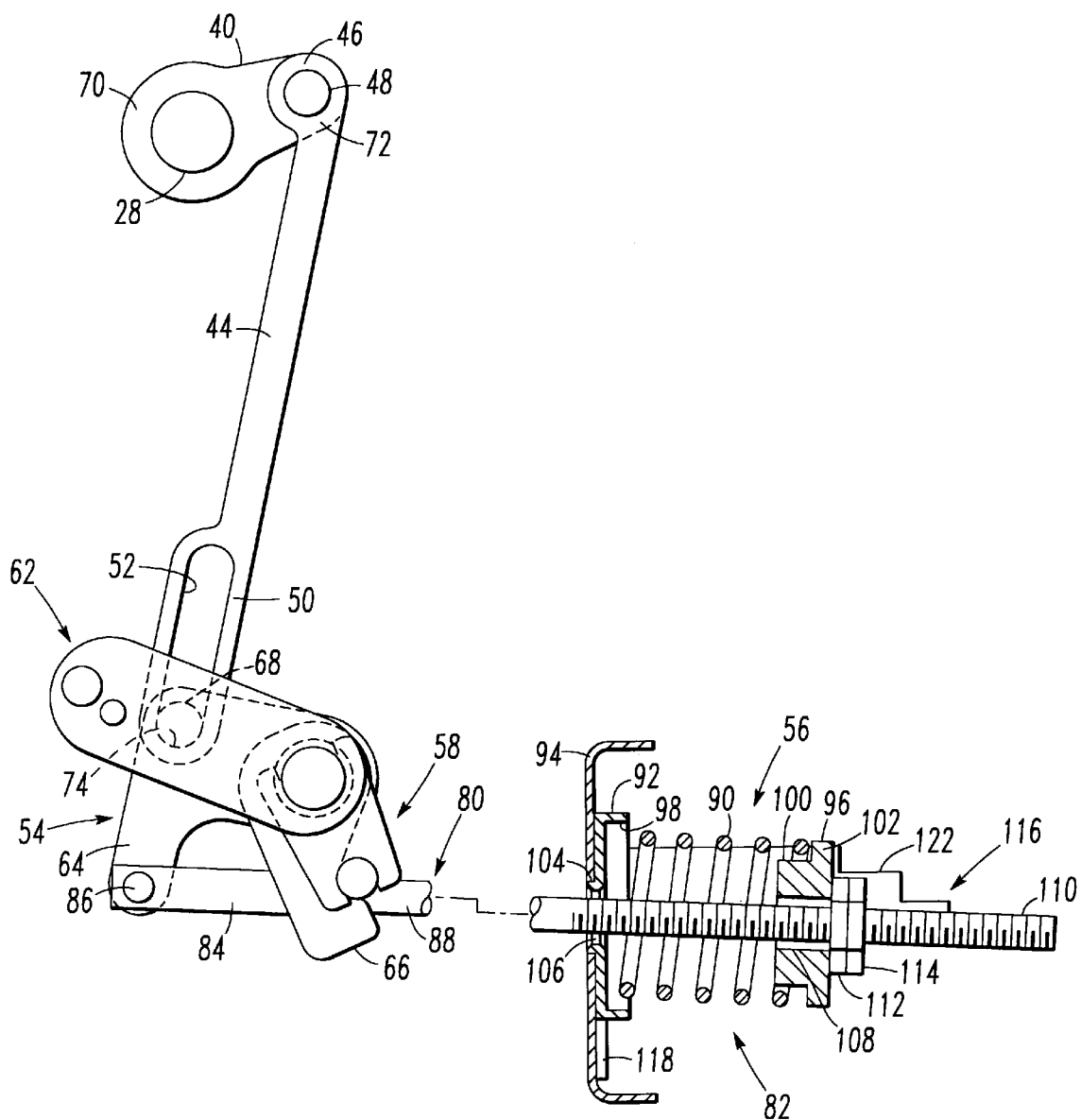
FIG. 3 is a side view, with some parts shown in cross section for clarity, of the operator apparatus of FIG. 2 with the vacuum circuit breaker in the open position.

Referring to FIG. 2, a VCB 26 has an operating shaft or pole shaft 28 and an improved MOC operator 30 in accordance with the present invention for operating the MOC assembly 4 of FIG. 1. Fixedly mounted to the pole shaft 28 are a pair of arms or push rods 32,34 for one of the exemplary three phases of VCB 26, with other push rods (not shown) being positioned to the left (with respect to FIG. 2) for the other phases. The push rods 32,34 engage an insulating linkage (not shown) which operates separable contacts 35 between their open position (not shown) and closed position. The pole shaft 28 (as shown in FIG. 3) rotates clockwise (with respect to FIGS. 3 and 6) to rotate from a first position (shown in FIG. 3) corresponding to the open position to a second position (shown in FIG. 6) corresponding to the closed position of the separable contacts 35. Also fixedly mounted to the pole shaft 28 are links 36,38 to a reset spring (not shown) which provides energy to rotate the pole shaft 28 counterclockwise (with respect to FIG. 6) to the open position of FIG. 3.

Referring to FIGS. 2 and 3, the MOC operator 30, which is driven by an operator lever 40 fixedly mounted to the pole shaft 28, includes a pair of drive links 42,44 having a first end 46 pivotally mounted to the operator lever 40 by pin 48 and a second end 50 having an elongated opening 52 (as shown with link 44 of FIG. 3), a hub mechanism 54 for clockwise rotation (with respect to FIG. 3) by the second end 50 of the links 42,44, a first spring mechanism 56 for biasing the hub mechanism 54 in the counterclockwise direction (with respect to FIG. 3), a shaft mechanism 58 for rotation with respect to the hub mechanism 54, a second spring mechanism 60 for biasing the shaft mechanism 58 in the clockwise direction (with respect to FIG. 3), and a drive/operating lever 62 engaging the shaft mechanism 58 for operating the MOC assembly 4 of FIG. 1.

The links 42,44, hub mechanism 54, and shaft mechanism 58 form a following mechanism 63 which is biased by the first spring mechanism 56 to follow pole shaft 28 when such pole shaft rotates in the clockwise direction (with respect to FIG. 3). The second spring mechanism 60 biases the drive/operating lever 62, which is engaged by shaft mechanism 58, toward a position corresponding to the open position of the MOC assembly 4 of FIG. 1 when the pole shaft 28 rotates in the clockwise direction. The following mechanism 63 recharges the first spring mechanism 56 when the pole shaft 28 rotates in the counterclockwise direction (with respect to FIG. 3).

The hub mechanism 54 includes a pair of arms 64,66 fixedly welded thereto as best shown in FIG. 7. The first arm 64 of the hub mechanism 54 pivotally engages the second end 50 of the drive links 42,44 through pin 68 at the elongated opening 52 of such links in order that the pole shaft 28 rotates clockwise (with respect to FIG. 3) from the open position of FIG. 3 to the closed position of FIG. 6 independently of the hub mechanism 54, the shaft mechanism 58, the drive/operating lever 62 and the MOC assembly 4 of FIG. 1. In this manner, the separable contacts 35 of VCB 26 are closed without any possible interference from the MOC operator 30 and the MOC assembly 4. Generally, after the VCB 26 switches the separable contacts 35 closed, the second arm 66 of the hub mechanism 54, which is biased by the first spring mechanism 56, engages the shaft mechanism 58 to rotate the shaft mechanism 58 and the drive/operating lever 62 in the counterclockwise direction (with respect to FIG. 3), thereby moving the MOC assembly 4 of FIG. 1 to the closed position.

Figure 4:
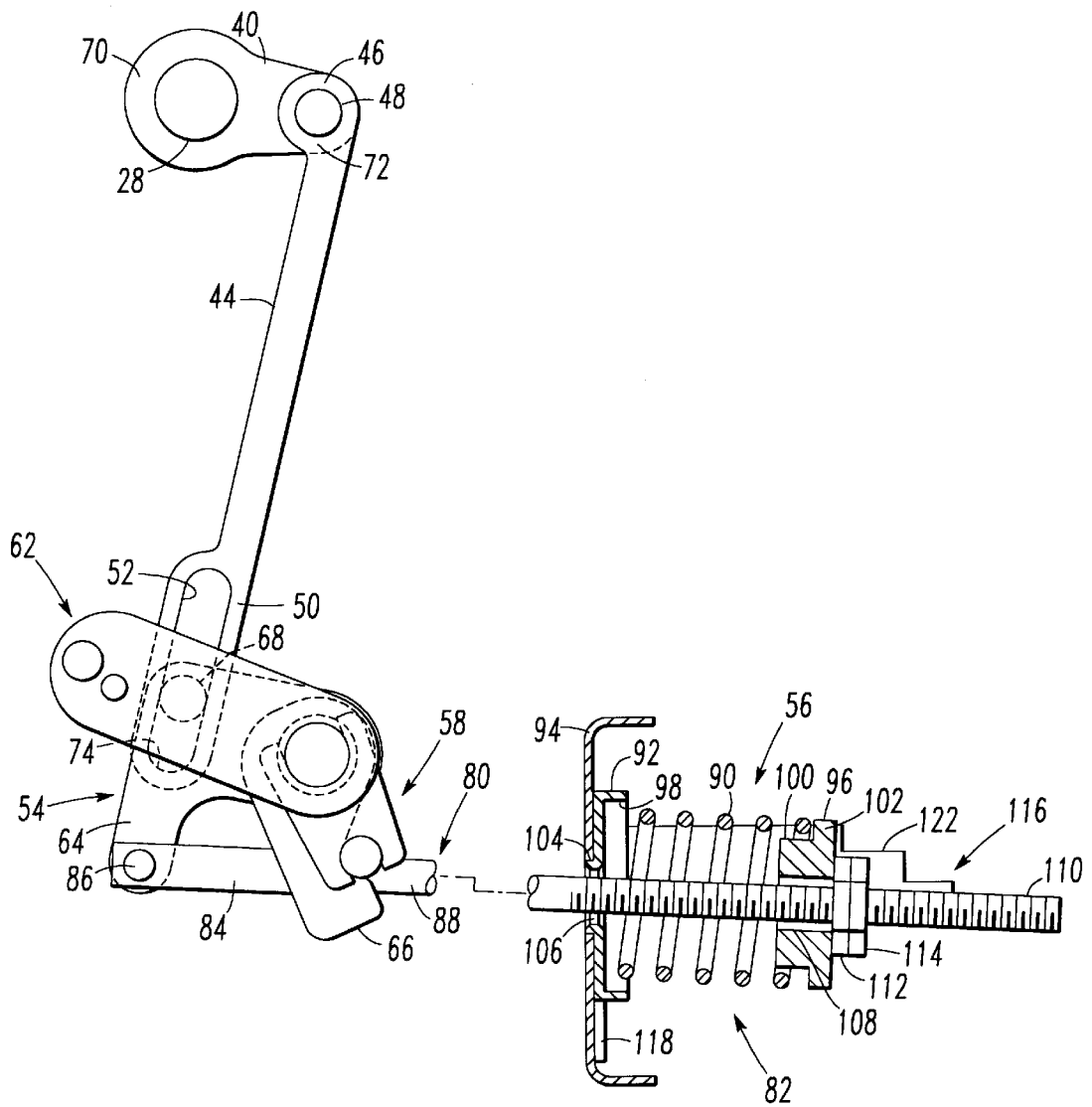
FIG. 4 is a side view, with some parts shown in cross section for clarity, of the operator apparatus of FIG. 2 with the vacuum circuit breaker moving from the open position to the closed position.

The rotatable pole shaft 28 includes the operator lever 40 having a first end 70 fixedly mounted to the pole shaft 28 and a second end 72 pivotally mounted to the first end 46 of the drive links 42,44. The pole shaft 28 rotates clockwise (with respect to FIG. 3) to drive the VCB 26 to the closed position thereof and rotates in the opposite counterclockwise direction (with respect to FIG. 3) to drive the VCB 26 to the open position thereof. As sequentially shown in FIGS. 3, 4 and 6, the pole shaft 28 first rotates clockwise to move the drive links 42,44 in a generally downward direction (with respect to FIGS. 3, 4 and 6).

In the initial position of FIG. 3, which corresponds to the open position of VCB 26, the drive links 42,44 at the lower end 74 of the elongated opening 52 engage pin 68 at the first arm 64 of the hub mechanism 54. The pin 68, which pins the first arm 64 to the second end 50 of the drive links 42,44 at the elongated opening 52 thereof, is rotatable and movable within the elongated opening 52. Next, at the position of FIG. 4, which is intermediate the open and closed positions of the VCB 26, the operator lever 40 of the pole shaft 28 has moved the drive links 42,44 generally downward, with the pin 68 within the central portion of the elongated opening 52. This is because the closing speed of the operating mechanism, which includes the pole shaft 28, of the VCB 26 is faster than the closing speed of the exemplary MOC operator 30 and MOC assembly 4. Then, at the final position of FIG. 6, which corresponds to the closed position of the VCB 26 and the closed position of the MOC operator 30, after the spring mechanism 56 drives hub mechanism 54 counterclockwise (with respect to FIG. 6), the pin 68 engages the drive links 42,44 at the lower end 74 of the elongated opening 52.

Figure 5:
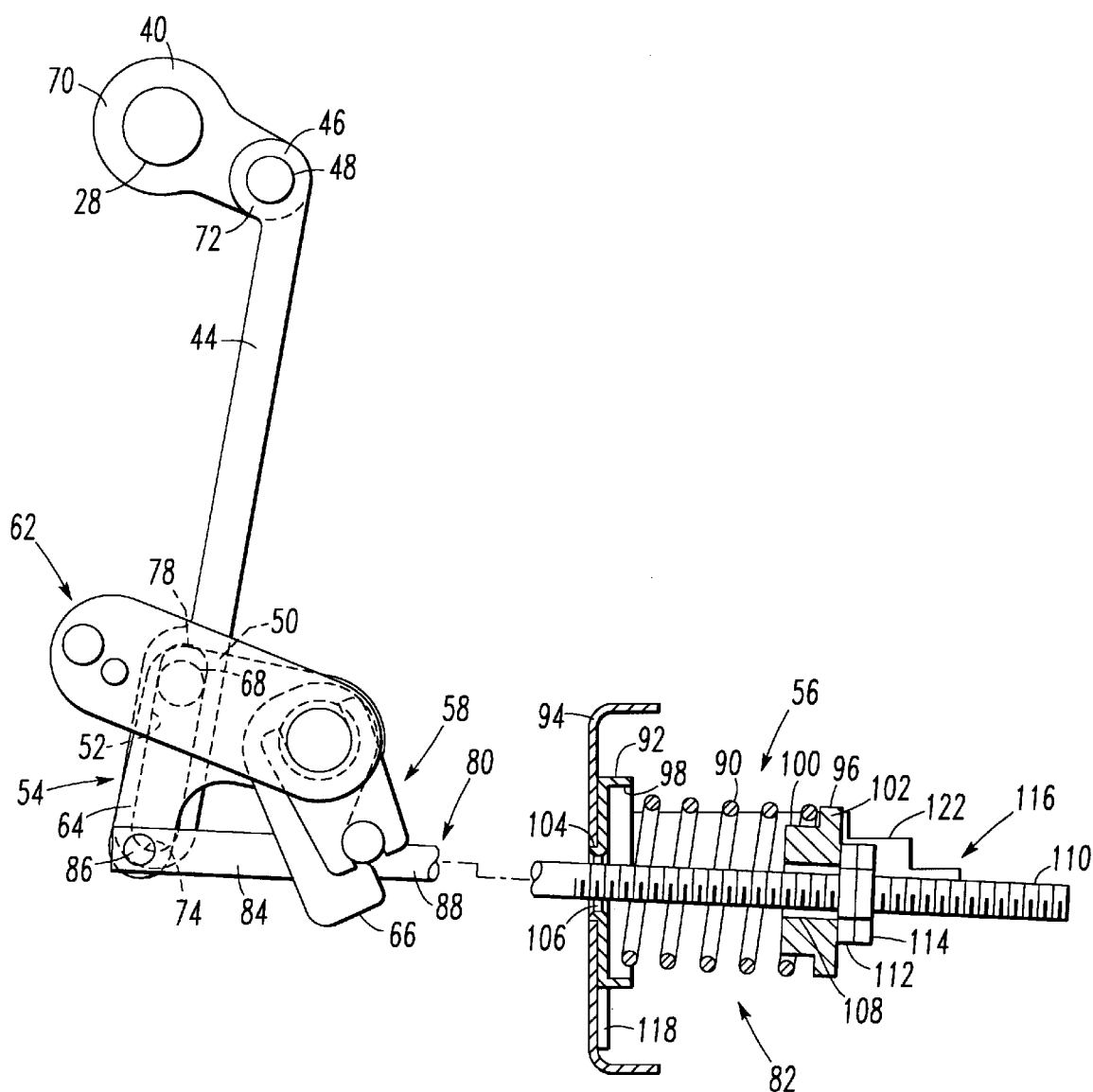
FIG. 5 is a side view, with some parts shown in cross section for clarity, of the operator apparatus of FIG. 2 with the vacuum circuit breaker in the closed position and the MOC assembly jammed in the open position.

An important aspect of the present invention is illustrated in FIG. 5 which shows the closed position of the VCB 26 with the MOC assembly 4 of FIG. 1 jammed in the open position. With the MOC assembly 4 jammed open, the hub mechanism 54 is fixed in the initial position of FIG. 3, and the drive links 42,44 at the upper end 78 of the elongated opening 52 are separated from the pin 68. In this manner, the full closing operation of the pole shaft 28 (from FIG. 3 to either of FIGS. 5 and 6) is possible even if the MOC assembly 4 is stalled open.

Figure 6:
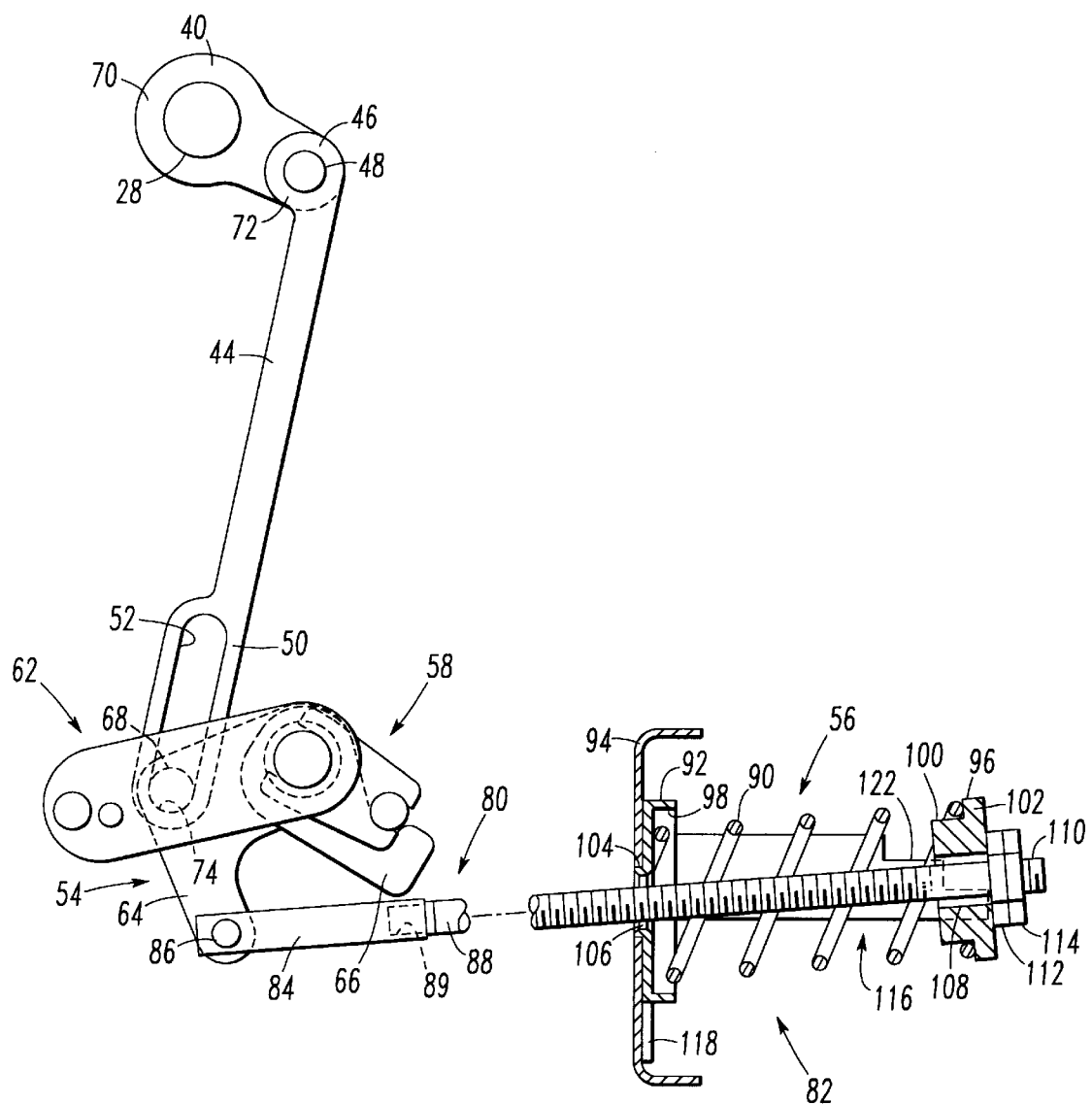
FIG. 6 is a side view, with some parts shown in cross section for clarity, of the operator apparatus of FIG. 2 with the vacuum circuit breaker and the MOC assembly both in the closed position.

During operation from the closed position of FIG. 6 back to the open position of FIG. 3, the pole shaft 28 rotates in the counterclockwise direction (with respect to FIGS. 3 and 6) to move the drive links 42,44 in a generally upward direction (with respect to FIGS. 3 and 6). In this manner, the lower end 74 of the drive links 42,44, at the elongated opening 52, engages the pin 68 and rotates the arm 64 and the hub mechanism 54 clockwise (with respect to FIG. 3), thereby recharging the first spring mechanism 56.

Normally, the shaft mechanism 58 is similarly rotated clockwise (with respect to FIG. 3) by the second spring mechanism 60 of FIG. 2. The second spring mechanism 60 biases a pin 61 of the shaft mechanism 58 in the clockwise direction. Under conditions where the MOC assembly 4 of FIG. 1 is jammed closed in the closed position of FIG. 6, the hub mechanism 54 may still be rotated clockwise (with respect to FIG. 6) and the first spring mechanism 56 may still be recharged independently from the MOC assembly 4, the drive/operating lever 62 and the shaft mechanism 58.

Continuing to refer to FIG. 3, the first spring mechanism 56 includes an operator link mechanism 80 and an auxiliary contact closing spring assembly 82. The spring assembly 82, through the operator link mechanism 80, biases the first arm 64 of the hub mechanism 54 counterclockwise (with respect to FIG. 3) and toward the position which corresponds to the closed position of the VCB 26 and the MOC assembly 4 of FIG. 1. The operator link mechanism 80 includes a device 84 at one end, which is pivotally mounted to the first arm 64 of the hub mechanism 54 by pin 86, and also includes a rod 88 at the other end. The rod 88, which is fixedly mounted by threads (not shown) within an opening 89 (shown in FIG. 6) of the device 84 at one end, engages the spring assembly 82 at the other end.

Preferably, the spring assembly 82 is adjustable to adjustably bias the hub mechanism 54 and, thereby, provides an appropriate force to overcome the total reset force resulting from different counts of MOC auxiliary switches 16,18,20 of the MOC assembly 4 of FIG. 1. The exemplary adjustable spring assembly 82 includes a spring 90, an end cap 92 for retaining the spring 90 at one end between a surface 94 of the VCB 26 and a spring retainer 96 at the other end. The exemplary end cap 92 has a recess 98 which engages the left end (with respect to FIG. 3) and the outer surface of the spring 90. The exemplary spring retainer 96 has a cylindrical portion 100 which engages the inner surface of the spring 90 and an end portion 102 which engages the right end (with respect to FIG. 3) of the spring 90.

The rod 88 of the operator link mechanism 80 passes through an opening 104 of the VCB surface 94, an opening 106 of the end cap 92 which is keyed into the opening 104, the central portion of the spring 90, and an opening 108 of the spring retainer 96. Preferably, a portion 110 of the rod 88 is threaded and the spring retainer 96 includes one or more fasteners, such as nuts 112,114, each having a threaded opening to engage the rod's threaded portion 110, thereby securing the spring retainer 96 in a selected position. Preferably, the first threaded fastener 112 secures the spring retainer 96 in the selected position, and the second threaded fastener 114 secures the first threaded fastener 112 at a corresponding position of the threaded portion 110 of the rod 88.

Preferably, a spring gauge 116 is advantageously employed to adjust the spring assembly 82. The exemplary spring gauge 116 includes a first surface 118 mounted to the VCB surface 94 and a second surface 122 extending parallel to the spring 90 from the surfaces 94,118. The exemplary surface 122 has a plurality of positions or steps corresponding to the plural adjustments of the adjustable spring assembly 82 for a plurality of counts of the auxiliary switches of the MOC assembly 4 of FIG. 1.

Referring to FIGS. 2, 7, 8 and 9, the first arm 64 of the hub mechanism 54, which pivotally engages the second end 50 of the drive links 42,44 to rotate the hub mechanism 54, fixedly engages the pin 68 for the drive links 42,44 about opening 124, and fixedly engages the pin 86 for the device 84 of the operator link mechanism 80 about opening 126. The second arm 66 of the hub mechanism 54 includes a recessed portion 128 for engaging a portion 130 of the pin 61 of the shaft mechanism 58 to rotate the pin 61 and, hence, the shaft mechanism 58 in the counterclockwise direction (with respect to FIG. 3) in order that the drive/operating lever 62 and the MOC assembly 4 of FIG. 1 operate the MOC auxiliary contacts to a position corresponding to the closed position of the VCB 26.

The shaft mechanism 58 rotates about a central bore 132 of the hub mechanism 54 along longitudinal axis 134. Disposed about opposite ends of the bore 132 are bearings 136,138 for rotatably engaging the shaft 140 (shown in hidden line drawing in FIG. 2) of the shaft mechanism 58. The hub mechanism 54 freely rotates clockwise (with respect to FIG. 3) with respect to the shaft mechanism 58 with the second arm 66 disengaged from the portion 130 of the shaft mechanism 58.

Referring to FIG. 9, the shaft mechanism 58 includes the rotatable drive shaft 140, a link 142 fixedly mounted to the shaft 140, and the pin 61 having first portion 130 for engagement by the second arm 66 of the hub mechanism 54 of FIG. 2 and second portion 144 for engagement by the second spring mechanism 60 (shown in phantom line drawing) of FIG. 2. A U-shaped portion at one end of the link 142 partially surrounds and is welded to the drive shaft 140. A generally U-shaped portion at the other end of the link 142 partially surrounds and is welded to the pin 61. The second arm 66 of the hub mechanism 54 engages the first portion 130 of the pin 61 to rotate the pin 61 and drive shaft 140 counterclockwise (with respect to FIG. 3). A loop at one end of the second spring mechanism 60, which biases the pin 61, the drive shaft 140 and the drive/operating lever 62 of FIG. 2 clockwise (with respect to FIG. 3), is retained on the second portion 144 by the link 142 and by surface 146 of the pin 61. As shown in FIG. 2, a loop at the other end of the second spring mechanism 60 conveniently engages a VCB fastener 145.

Referring to FIGS. 2 and 9, the drive shaft 140 includes a circumferential groove 148 which engages a retaining ring 150 (shown in FIG. 2). First and second bearing assemblies 151 and 152 rotatably support the right and left ends (with respect to FIG. 2), respectively, of the drive shaft 140 of the shaft mechanism 58. A thrust washer 153A is disposed between the left end of the hub mechanism 54 and the second bearing assembly 152. Two thrust washers 153B, 153C are disposed on opposite sides of the first bearing assembly 151. The retaining ring 150 is employed to hold the drive shaft 140 in place with respect to the first bearing assembly 151. A thrust washer 153D is disposed between the right end of the hub mechanism 54 and the link 142 of the rotatable drive shaft 140. Two bores 155,156, which are disposed radially through the drive shaft 140, capture two pins 157,158 of the drive/operating lever 62 to secure such lever to the drive shaft 140.

The drive/operating lever 62 of FIG. 10 includes a lever 159, a drive lever pin 160, an operating pin 162 for operating the pantograph channel 24 of FIG. 1, and a hub 164 for engaging the drive shaft 140 of FIG. 9. The pins 160,162, which are plug welded within openings of the lever 159, engage the pantograph 12 of FIG. 1. The drive lever pin 160 prevents the pantograph channel 24 from disengaging from the operating pin 162 when the VCB 26 is being operated in a test position. The operator pin 162 is used to drive the pantograph channel 24 down to its closed position and to assist the reset springs (not shown) of the MOC assembly 4 of FIG. 1 in resetting such channel to its open position. The hub 164, which is welded to the lever 159, includes a bore 166 therethrough. The bore 166 is coextensive with an opening 167 of the lever 159. Openings 168,169 and 170, 171 through the wall of the hub 164 accept the pins 157 and 158, respectively, of FIG. 2.

Whenever the drive/operating lever 62 is restrained in a position corresponding to the open position of the VCB 26 of FIG. 2, the drive shaft 140 of the shaft mechanism 58 and the second arm 66 of the hub mechanism 54 are also restrained in a position corresponding to such VCB open position. Under this malfunction of the MOC assembly 4 of FIG. 1, the exemplary elongated opening 52 of the drive links 42,44 permits normal closing operation of VCB 26. On the other hand, whenever the drive/operating lever 62 is restrained in a position corresponding to the closed position of the VCB 26, the drive shaft 140 is also restrained in a position corresponding to such VCB closed position. For this MOC assembly malfunction, when the VCB 26 is switched from the closed to the open position, the drive links 42,44 rotate the hub mechanism 54 and recharge the spring mechanism 56 through the operator link mechanism 80 independently from the drive/operating lever 62 and the drive shaft 140.

Figure 11:
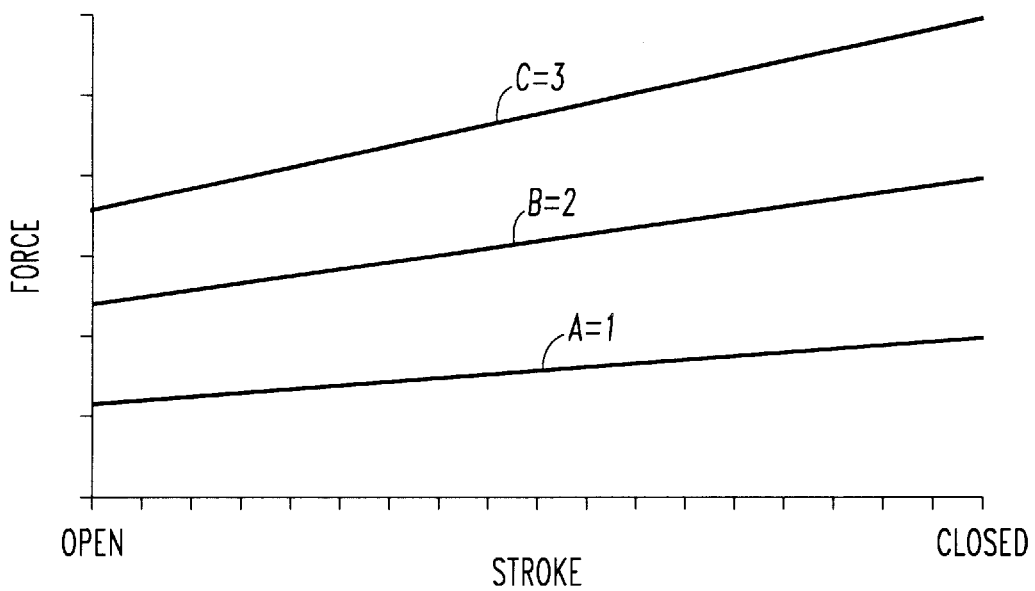
FIG. 11 is a plot illustrating the force employed to operate the MOC assembly of FIG. 1 from the open position to the closed position for various counts of MOC auxiliary switches.
Figure 12:
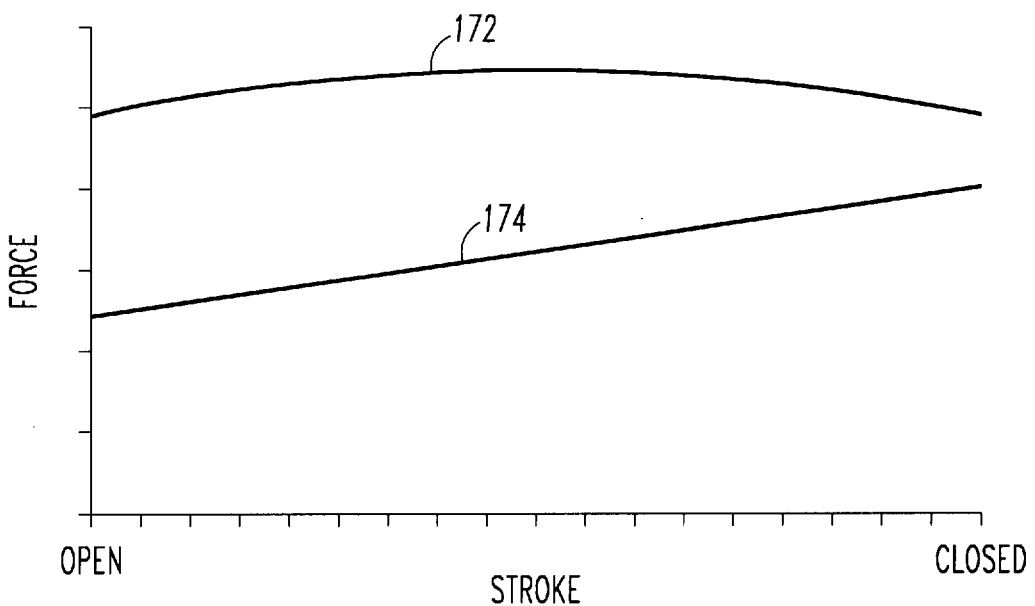
FIG. 12 is a plot illustrating energy balance from the open position to the closed position for two MOC auxiliary switches in the MOC assembly of FIG. 1.

FIG. 11 is a plot illustrating the force employed to operate the MOC assembly 4 of FIG. 1 from the open position to the closed position for various counts (e.g., A=1, B=2, C=3) of MOC auxiliary switches. The force needed to close the MOC assembly 4 changes with the count of MOC auxiliary switches, as shown in FIG. 1. The adjustable spring mechanism 56 of FIG. 2 is advantageously employed by the exemplary MOC operator 30 to drive the MOC assembly 4. The proper selection of the force of the drive spring 90 provides suitable closing energy with respect to the opposing opening energy of the MOC auxiliary switches. Preferably, this spring force selection provides sufficient closing energy to reliably close the MOC operator 30 and, also, to limit the closing velocity of such MOC operator. As shown in FIG. 12, for an exemplary count of two MOC auxiliary switches, the closing energy is the area of the plot between the upper drive spring force curve 172 and the lower MOC auxiliary switch force curve 174 which provides the opening energy.

The MOC drive spring 90 of the spring mechanism 56 of FIG. 2 is compressed or charged when the VCB 26 is opened. On the other hand, when the VCB 26 is closed, the MOC operator 30 releases the charged spring 90 to drive the MOC assembly 4 of FIG. 1. By controlling the closing energy of the MOC assembly 4, the MOC velocity during closing is also slowed to a suitable level. By suitably adjusting the MOC drive spring 90, which is tuned to the count of MOC auxiliary switches, the response of the MOC system is controlled and the moving mass of the MOC assembly 4 is decoupled from the dynamic behavior of the VCB 26.

Figure 13:
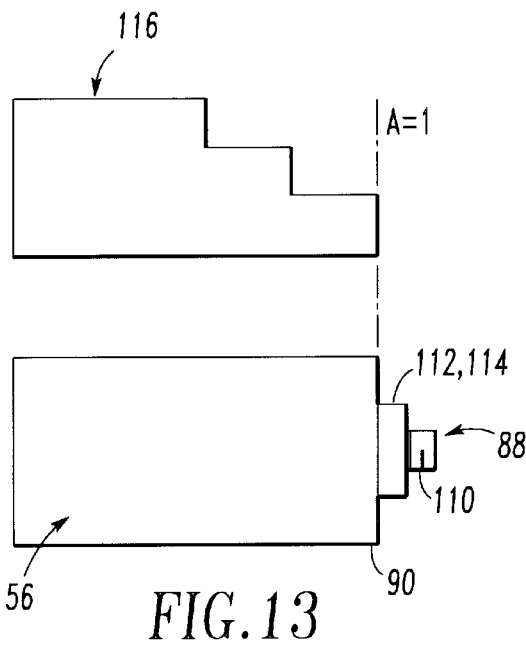
FIGS. 13, 14 and 15 illustrate a drive spring gauge positioned next to a drive spring of the operator apparatus of FIG. 2 for one, two and three auxiliary switches, respectively.
Figure 14:
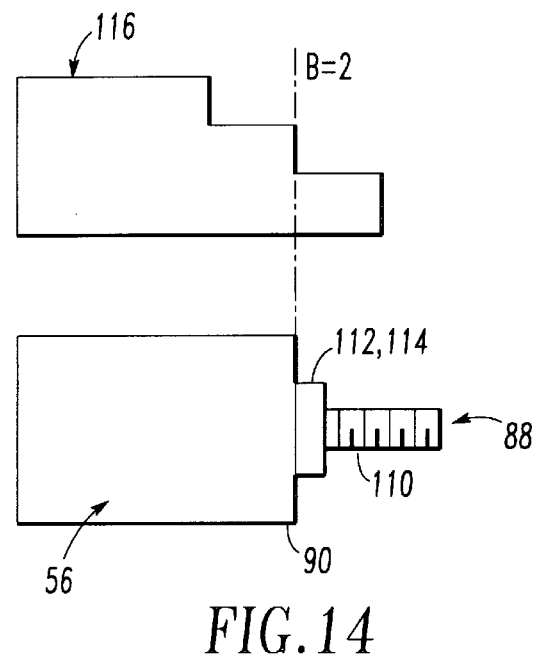
Figure 15:
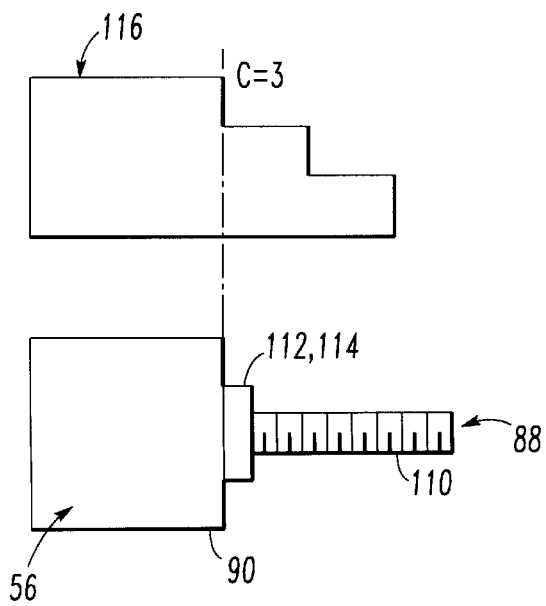

FIGS. 13, 14 and 15 illustrate the drive spring gauge 116 positioned next to the drive spring 90 of the second spring mechanism 56 of FIG. 2 for one, two and three auxiliary switches, respectively. In order to provide additional closing energy, the drive spring 90 is compressed to a relatively larger extent for a greater count of MOC auxiliary switches. The exemplary MOC operator 30 achieves the goal of controlling the velocity of the MOC assembly 4 of FIG. 1 by balancing the selected closing energy with the MOC assembly mass and return springs. The adjustment employed to tune the MOC system is made by setting the compression of the drive spring 90. The nut 112 and jam nut 114 on the threaded portion 110 of the rod 88 are employed to select and lock the desired adjustment, respectively. The gauge 116 is conveniently adjacent the drive spring 90 to provide the user with a guide in adjusting the spring 90.

In terms of most anticipated applications, the VCB 26 is preferably preset for the particular application of one MOC auxiliary switch. For the cases of two or three MOC auxiliary switches, the drive spring 90 is then adjusted. For safety and ease of adjustment, the adjustment is made with the VCB 26 drawn-out of the switchgear cell (not shown), with the VCB 26 open, and all VCB mechanism springs discharged.

In cases where VCB interchangeability is desired between multiple switchgear cell locations in which the count of MOC auxiliary switches varies over those locations, if the VCB 26 is moved to a switchgear cell with a different MOC auxiliary switch count, then such VCB is re-adjusted and, preferably, is re-labeled to indicate the latest adjustment.

In the case where the MOC operator 30 is inadvertently adjusted for more MOC auxiliary switches than the actual MOC auxiliary switch count, the MOC system will operate, although increases in mechanical wear, switch bounce, and overtravel of the MOC assembly 4 may occur. Otherwise, if the MOC operator 30 is improperly adjusted for fewer MOC auxiliary switches than the actual MOC switch count, the MOC assembly 4 will not fully close, and the MOC auxiliary switches may not properly indicate the true VCB status. In either of these cases of improper adjustment, the exemplary MOC operator 30 ensures that the operation of the VCB 26 is not affected.

The exemplary MOC operator 30 slows the operation of the MOC assembly 4 to acceptable levels, and eliminates the possibility of the VCB 26 being stalled by the MOC assembly 4. The exemplary MOC operator 30 also allows an effective evaluation of the condition of the MOC assembly 4. If the VCB drive spring 90 is properly adjusted for the count of MOC auxiliary switches, but the MOC assembly 4 does not fully open or close, then maintenance of the MOC assembly 4 is indicated.

Operation of the VCB 26 is effectively separated from the varying loads and dynamics of the MOC assembly 4. The exemplary MOC operator 30 mimics magnetic air breaker dynamics and velocities. The exemplary MOC operator 30 ensures that a failure of the MOC assembly 4 or the MOC operator 30 cannot stall or affect the operation of the VCB 26; increases mechanical reliability for both the VCB 26 and the MOC assembly 30; eliminates misoperation (i.e., contact bounce) of the MOC auxiliary switches; employs energy balance to reduce impact loads and mechanical wear and increase component life of the VCB 26 and MOC assembly 4; facilitates user evaluation of the MOC assembly 4; and provides a tested system solution, incorporating both the VCB 26 and the MOC assembly 4.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An operator apparatus for use with an electrical switching apparatus having a pole shaft which is rotatable in a first direction and a second direction, said operator apparatus for operating auxiliary contact means between a first position and a second position and comprising:

following means biased to follow said pole shaft for following said pole shaft when said pole shaft rotates in said first direction;

first biasing means for biasing said following means to follow said pole shaft when said pole shaft rotates in said first direction, with said following means including means for recharging said first biasing means when said pole shaft rotates in said second direction;

means engaged by said following means for operating said auxiliary contact means to said first position when said following means follows said pole shaft and said pole shaft rotates in said first direction; and second biasing means for biasing said means engaged by said following means toward a position corresponding to said second position of said auxiliary contact means when said pole shaft rotates in said second direction.

2. The operator apparatus as recited in claim 1 wherein said following means comprises:

a drive link having a first end pivotally mounted to said pole shaft and a second end having an elongated opening, hub means for rotation by the second end of said drive link, said hub means having arm means fixedly mounted thereto, and shaft means for rotation with respect to said hub means, said shaft means including a rotatable shaft and means for rotating the rotatable shaft, with the arm means of said hub means engaging said means for rotating the rotatable shaft to rotate said shaft means in a first rotational direction, and with the arm means of said hub means pivotally engaging the second end of said drive link at the elongated opening thereof in order that said pole shaft rotates in said first direction independently of said auxiliary contact means.

3. The operator apparatus as recited in claim 2 wherein said first biasing means includes first means for biasing said hub means in the first rotational direction; and wherein said second biasing means includes second means for biasing said shaft means in a second rotational direction.

4. The operator apparatus as recited in claim 1 wherein said auxiliary contact means has at least one switch; and wherein said first biasing means includes an adjustable spring means and a gauge having a plurality of positions corresponding to a plurality of adjustments of said adjustable spring means for a plurality of counts of said at least one switch.

5. An operator apparatus for use with an electrical switching apparatus having pole shaft means rotatable between a first position and a second position, said operator apparatus for operating auxiliary contact means and comprising:

a drive link having a first end pivotally mounted to said pole shaft means and a second end having an elongated opening;

hub means for rotation by the second end of said drive link, said hub means having arm means fixedly mounted thereto;

first biasing means for biasing said hub means in a first rotational direction;

shaft means for rotation with respect to said hub means, said shaft means including a rotatable shaft and means for rotating the rotatable shaft, with the arm means of said hub means engaging said means for rotating the rotatable shaft to rotate said shaft means in the first rotational direction;

second biasing means for biasing said shaft means in a second rotational direction; and means engaging the rotatable shaft of said shaft means for operating said auxiliary contact means, with the arm means of said hub means pivotally engaging the second end of said drive link at the elongated opening thereof in order that said pole shaft means rotates from the first position to the second position thereof independently of said auxiliary contact means.

6. The operator apparatus as recited in claim 5 wherein said electrical switching apparatus has a closed position and an open position; wherein said pole shaft means rotates in one rotational direction to drive said electrical switching apparatus to the closed position thereof and rotates in another rotational direction to drive said electrical switching apparatus to the open position thereof; wherein said pole shaft means first rotates in said one rotational direction to move said drive link in a generally longitudinal direction; wherein said means engaging the rotatable shaft of said shaft means is restrained in a position corresponding to the open position of said electrical switching apparatus in order that the rotatable shaft of said shaft means and the arm means of said hub means are restrained in a position corresponding to the open position of said electrical switching apparatus; wherein the elongated opening of the second end of said drive link has a first end and a second end; and wherein said drive link moves in the generally longitudinal direction from: (a) a first position, corresponding to the open position of said electrical switching apparatus, where said drive link at the first end of the elongated opening engages the arm means, to: (b) a second position, corresponding to the closed position of said electrical switching apparatus, where said drive link at the second end of the elongated opening is separated from the arm means of said hub means.

7. The operator apparatus as recited in claim 5 wherein said electrical switching apparatus has a closed position and an open position; wherein said pole shaft means rotates in one rotational direction to drive said electrical switching apparatus to the closed position thereof and rotates in another rotational direction to drive said electrical switching apparatus to the open position thereof; wherein said pole shaft means first rotates in said other rotational direction to move said drive link; wherein said means engaging the rotatable shaft of said shaft means is restrained in a position corresponding to the closed position of said electrical switching apparatus in order that the rotatable shaft of said shaft means is restrained in a position corresponding to the closed position of said electrical switching apparatus; and wherein said hub means freely rotates with respect to said shaft means with the arm means disengaged from said shaft means.

8. The operator apparatus as recited in claim 5 wherein said electrical switching apparatus has a closed position and an open position; wherein said pole shaft means rotates in one rotational direction to drive said electrical switching apparatus to the closed position thereof and rotates in another rotational direction to drive said electrical switching apparatus to the open position thereof; wherein the elongated opening of the second end of said drive link has a first end and a second end; wherein said pole shaft means first rotates in said one rotational direction to move said drive link in a generally longitudinal direction from: (a) a first position, corresponding to the open position of said electrical switching apparatus, where said drive link at the first end of the elongated opening engages the arm means, toward: (b) a second position, corresponding to the closed position of said electrical switching apparatus, where said drive link at the second end of the elongated opening is separated from the arm means; wherein the arm means of said hub means: (a) pivotally engages the second end of said drive link at the elongated opening thereof to rotate said hub means, and (b) engages said means for rotating the rotatable shaft to rotate said shaft means in the first rotational direction in order that said means engaging the rotatable shaft of said shaft means operates said auxiliary contact means to a position corresponding to the closed position of said electrical switching apparatus.

9. The operator apparatus as recited in claim 5 wherein said hub means includes a bore at least partially therethrough and bearing means about said bore for rotatably engaging the rotatable shaft of said shaft means.

10. The operator apparatus as recited in claim 5 wherein said pole shaft means includes a rotatable pole shaft and an operator lever having a first end fixedly mounted to said rotatable pole shaft and a second end pivotally mounted to the first end of said drive link.

11. The operator apparatus as recited in claim 5 wherein the arm means of said hub means includes a first arm to pivotally engage the second end of said drive link, and a second arm to engage said means for rotating the rotatable shaft.

12. The operator apparatus as recited in claim 11 wherein said drive link moves in a generally longitudinal direction when said pole shaft means rotates from the first position to the second position thereof; and wherein the first arm of the arm means includes pin means for pinning said first arm to the second end of said drive link at the elongated opening thereof, with said pin means rotatable and movable within said elongated opening.

13. The operator apparatus as recited in claim 11 wherein said first biasing means includes operator link means pivotally mounted to the first arm of the arm means of said hub means; and spring means for biasing said operator link means and said first arm.

14. The operator apparatus as recited in claim 11 wherein said shaft means further includes a link having a first end fixedly mounted to the rotatable shaft and a second end, and a pin fixedly mounted to the second end of said link, with the second arm of the arm means of said hub means engaging said pin to rotate said shaft means in the first rotational direction.

15. An electrical switching apparatus for use with auxiliary contact means, said electrical switching apparatus comprising:
separable contact means having a first position and a second position;
means for moving said separable contact means between the first position and the second position thereof, said means for moving having a first position corresponding to the first position of said separable contact means and a second position corresponding to the second position of said separable contact means; and
operator means for operating said auxiliary contact means between first and second positions corresponding to the first and second positions, respectively, of said separable contact means, said operator means comprising:

following means biased to follow said means for moving when said means for moving changes to the first position thereof,
first biasing means for biasing said following means to follow said means for moving when said means for moving changes to the first position thereof, with said following means including means for recharging said first biasing means when said means for moving changes to the second position thereof,
means engaged by said following means for operating said auxiliary contact means to the first position thereof when said following means follows said means for moving and said means for moving changes to the first position thereof, and
second biasing means for biasing said means engaged by said following means toward a position corresponding to the second position of said auxiliary contact means when said means for moving changes to the second position thereof.

16. The electrical switching apparatus as recited in claim 15 wherein said first biasing means includes an adjustable spring means.

17. The electrical switching apparatus as recited in claim 16 wherein said auxiliary contact means has at least one switch; and wherein said first biasing means further includes a gauge having a plurality of positions corresponding to a plurality of adjustments of said adjustable spring means for a plurality of counts of said at least one switch.

18. The electrical switching apparatus as recited in claim 15 wherein said means for moving said separable contact means between the first position and the second position thereof includes a pole shaft; and wherein said following means comprises:
a drive link having a first end pivotally mounted to said pole shaft and a second end having an elongated opening,
hub means for rotation by the second end of said drive link, said hub means having arm means fixedly mounted thereto, and
shaft means for rotation with respect to said hub means, said shaft means including a rotatable shaft and means for rotating the rotatable shaft, with the arm means of said hub means engaging said means for rotating the rotatable shaft to rotate said shaft means in a first rotational direction, and with the arm means of said hub means pivotally engaging the second end of said drive link at the elongated opening thereof in order that said pole shaft rotates in said first direction independently of said auxiliary contact means.

19. The electrical switching apparatus as recited in claim 18 wherein said first biasing means includes first means for biasing said hub means in the first rotational direction; and wherein said second biasing means includes second means for biasing said shaft means in the second rotational direction.

20. The electrical switching apparatus as recited in claim 18 wherein said first biasing means includes spring means for biasing the arm means of said hub means.

21. The electrical switching apparatus as recited in claim 18 wherein said auxiliary contact means has at least one switch; wherein said first biasing means includes an adjustable spring means and a gauge having a plurality of positions corresponding to a plurality of adjustments of said adjustable spring means for a plurality of counts of said at least one switch; wherein said electrical switching apparatus has a surface; wherein said first biasing means further includes an operator rod having a first end pivotally mounted to the arm means of said hub means and a second end with a plurality of threads; wherein said adjustable spring means includes a spring and spring retainer means for retaining said spring between the surface of said electrical switching apparatus and said spring retainer means, with said spring retainer means having a threaded opening engaging the threads of the second end of said operator rod.

22. The electrical switching apparatus as recited in claim 21 wherein said adjustable spring means further includes an end cap between said spring and the surface of said electrical switching apparatus; and wherein said spring has a first end engaging said end cap and a second end engaging said spring retainer means.

23. The electrical switching apparatus as recited in claim 21 wherein said spring retainer means includes a first threaded fastener, a second threaded fastener and a spring retainer, with the first threaded fastener securing said spring retainer in the selected position, and with the second threaded fastener securing said first threaded fastener at a selected position at the second end of said operator rod.

* * * * *